(12) United States Patent
Chuang

(10) Patent No.: US 6,377,534 B1
(45) Date of Patent: Apr. 23, 2002

(54) OPTICAL DISK DRIVE ASSEMBLY HAVING A CONTROL PANEL MOUNTED MOVABLY THEREON

(75) Inventor: Kuei-Chu Chuang, Taipei (TW)

(73) Assignee: Compal Electronics, Inc., Taipei (TW)

( * ) Notice: Subject to any disclaimer, the term of this patent is extended or adjusted under 35 U.S.C. 154(b) by 0 days.

(21) Appl. No.: 09/523,978

(22) Filed: Mar. 13, 2000

(51) Int. Cl.⁷ .............................................. G11B 33/02
(52) U.S. Cl. ..................................................... 369/75.1
(58) Field of Search .............................. 369/75.1–75.2, 369/77.1–77.2

(56) References Cited

U.S. PATENT DOCUMENTS

| | | | |
|---|---|---|---|
| 5,848,042 A | * 12/1998 | Takahashi et al. | 369/75.1 |
| 5,852,594 A | * 12/1998 | Kaise et al. | 369/75.1 |
| 5,953,302 A | * 9/1999 | Kobayashi | 369/75.1 |

* cited by examiner

*Primary Examiner*—Allen Cao
(74) *Attorney, Agent, or Firm*—Pillsbury Winthrop LLP

(57) ABSTRACT

An optical disk drive assembly includes a hollow housing, an optical disk drive, and a control panel. The hollow housing has a bottom wall, and a front opening formed at a front end of the bottom wall. The optical disk drive is mounted inside the hollow housing and is disposed rearwardly of the front end of the bottom wall. The control panel is movably disposed forwardly of the optical disk drive at the front end of the bottom wall. The control panel has a plurality of control keys disposed on a side face thereof. The control keys are connected electrically to the optical disk drive for manipulation of the optical disk drive. The control panel is mounted pivotally inside the hollow housing about a pivot axis that extends in a lateral direction substantially transverse to a front-to-rear direction of the hollow housing to turn between a first position and a second position. In the first position, the side face of the control panel faces rearwardly of the hollow housing to conceal the control keys inside the hollow housing. In the second position, the side face of the control panel faces upwardly of the hollow housing to expose the control keys at the front opening.

8 Claims, 5 Drawing Sheets

OPTICAL DISK DRIVE ASSEMBLY HAVING A CONTROL PANEL MOUNTED MOVABLY THEREON

BACKGROUND OF THE INVENTION

1. Field of the Invention

This invention relates to an optical disk drive assembly, more particularly to an optical disk drive assembly having a control panel mounted movably thereon.

2. Description of the Related Art

It is well known that notebook personal computers (PC) are equipped with optical disk drives, such as compact disk read-only-memory (CD-ROM) and digital versatile disk read-only-memory (DVD-ROM), for listening to music and watching video programs. However, the control keys for manipulation of the optical disk drives are liable to be depressed unintentionally when the optical disk drives are in use, thereby resulting in misoperation of the optical disk drives. In addition, the control keys of the optical drive disks occupy precious space on the keyboards of notebook PCs when the optical disk drives are not in use.

SUMMARY OF THE INVENTION

The object of the present invention is to provide an optical disk drive assembly in which the control keys for manipulation of an optical disk drive of the optical disk drive assembly will not be depressed unintentionally when the optical disk drive assembly is in use.

Another object of the present invention is to provide an optical disk drive assembly that will not occupy space on the keyboard of a notebook PC.

According to the present invention, the optical disk drive assembly comprises a hollow housing, an optical disk drive, and a control panel. The hollow housing has a bottom wall, and a front opening formed at a front end of the bottom wall. The optical disk drive is mounted inside the hollow housing and is disposed rearwardly of the front end of the bottom wall. The control panel is movably disposed forwardly of the optical disk drive at the front end of the bottom wall. The control panel has a plurality of control keys disposed on a side face thereof. The control keys are connected electrically to the optical disk drive for manipulation of the optical disk drive. The control panel is mounted pivotally inside the hollow housing about a pivot axis that extends in a lateral direction substantially transverse to a front-to-rear direction of the hollow housing to turn between a first position and a second position. In the first position, the side face of the control panel faces rearwardly of the hollow housing to conceal the control keys inside the hollow housing. In the second position, the side face of the control panel faces upwardly of the hollow housing to expose the control keys at the front opening.

In the preferred embodiment, the hollow housing further has two opposite side walls extending upward from two opposite sides of the bottom wall and extending rearwardly from the front end of the bottom wall. Each of the opposite side walls has a front portion adjacent to the front end of the bottom wall, and a pivot hole formed in the front portion thereof. The control panel is elongated in a direction parallel to the lateral direction. The control panel has two pivot axles extending longitudinally and outwardly from two opposite ends thereof and extending coaxially with the pivot axis. The pivot axles are inserted into the pivot holes in the side walls in order to connect pivotally the control panel to the hollow housing between the opposite side walls.

Preferably, the optical disk drive assembly further comprises a positioning device for positioning the control panel in the first position.

BRIEF DESCRIPTION OF THE DRAWINGS

Other features and advantages of the present invention will become apparent in the following detailed description of the preferred embodiments of the invention, with reference to the accompanying drawings, in which.

DETAILED DESCRIPTION OF THE PREFERRED EMBODIMENTS

Figure 1:
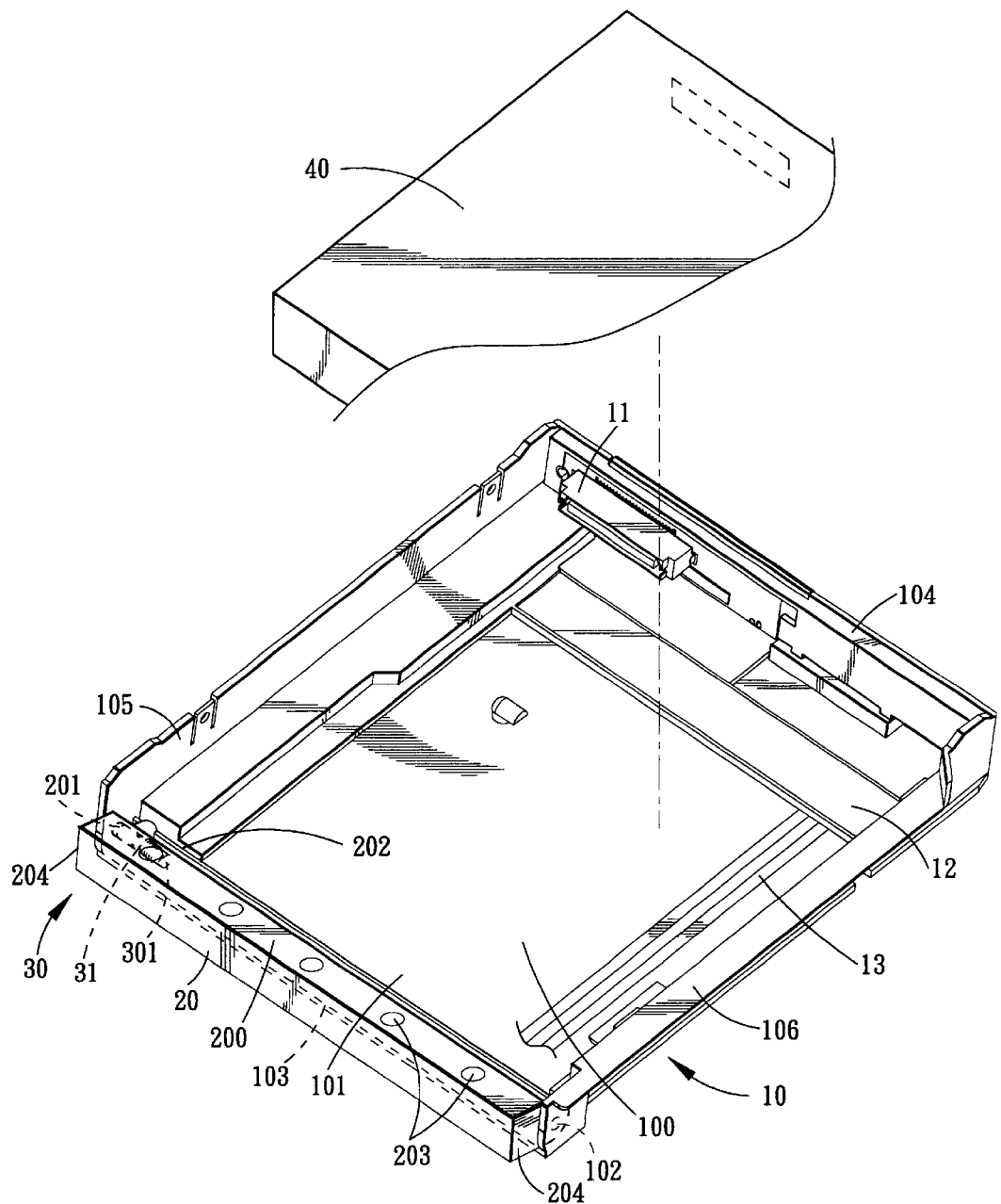
FIG. 1 is an exploded perspective view of a first preferred embodiment of an optical disk drive assembly according to the present invention.

Before the present invention is disclosed in greater detail, it should be noted that like elements are denoted by the same reference numerals throughout the disclosure.

Referring to FIG. 1, a first preferred embodiment of an optical disk drive assembly according to the present invention is shown to comprise a hollow housing 10 adapted to be mounted within a notebook PC (not shown), an optical disk drive 40, such as a CD-ROM or DVD-ROM, and a control panel 20.

As shown, the hollow housing 10 is adapted to house the optical disk drive 40, and has a bottom wall 100, a front opening 101 formed adjacent to a front end 103 of the bottom wall 100, and a rear wall 104 extending upwardly from a rear end of the bottom wall 100 and opposed to the front opening 101. A circuit board 12 is mounted on the rear wall 104 and has an electrical connector 11 that is connected electrically to the optical disk drive 40. The hollow housing 10 further has opposite first and second side walls 105, 106 extending upwardly from two opposite sides of the bottom wall 100 and extending rearwardly from the front end 103 of the bottom wall 100. Each of the opposite side walls 105, 106 has a pivot hole 102 formed in a front portion adjacent to the front end 103 of the bottom wall 100.

Figure 3:
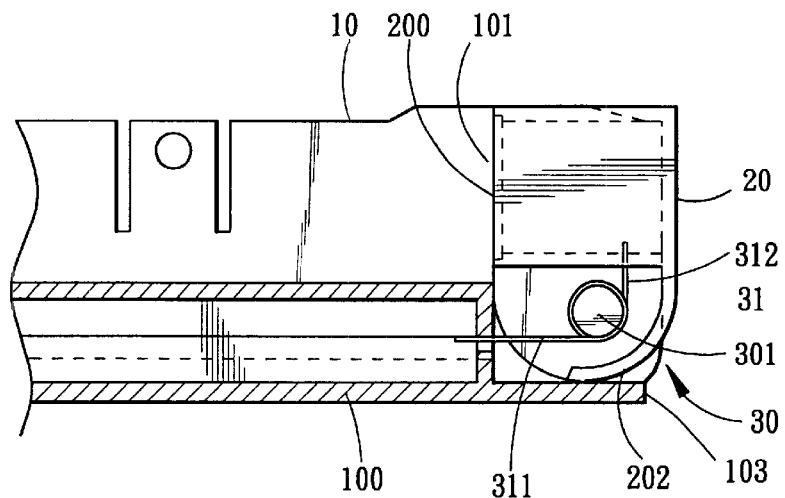
FIG. 3 is a fragmentary sectional view of the first preferred embodiment of the optical disk drive assembly according to the present invention, in which an optical disk drive is removed for the sake of clarity.

The optical disk drive 40 is mounted inside the hollow housing 10 and is disposed rearwardly of the front end 103 of the bottom wall 100. The control panel 20 is movably disposed forwardly of the optical disk drive 40 at the front end 103 of the bottom wall 100. The control panel 20 has a plurality of control keys 203 disposed on a substantially flat side face 200 thereof. The control keys 203 are connected electrically to the optical disk drive 40 for manipulation of the optical disk drive 40, which will be described in greater detail hereinbelow. The control panel 20 is mounted pivotally inside the hollow housing 10 about a pivot axis that extends in a lateral direction substantially transverse to a front-to-rear direction of the hollow housing 10 to turn between a first position and a second position. In the first position, the side face 200 of the control panel 20 faces rearwardly of the hollow housing 10 to conceal the control keys 203 inside the hollow housing 10, as best illustrated in FIG. 3. In the second position, the side face 200 of the control panel 20 faces upwardly of the hollow housing 10 to expose the control keys 203 at the front opening 101, as best illustrated in FIG. 1. The control panel 20 is elongated in a direction parallel to the lateral direction, and has two pivot axles 201 extending longitudinally and outwardly from two opposite ends 204 adjacent to an arcuate side face 202 that is opposed to the side face 200. The pivot axles 201 extend coaxially with the pivot axis and are inserted into the pivot holes 102 in the side walls 105, 106 in order to connect pivotally the control panel 20 to the hollow housing 10 between the opposite side walls 105, 106. The control keys 203 include buttons for controlling several functions of the optical disk drive 40, for example, the play, forward, review, stop, and power functions.

Figure 2:
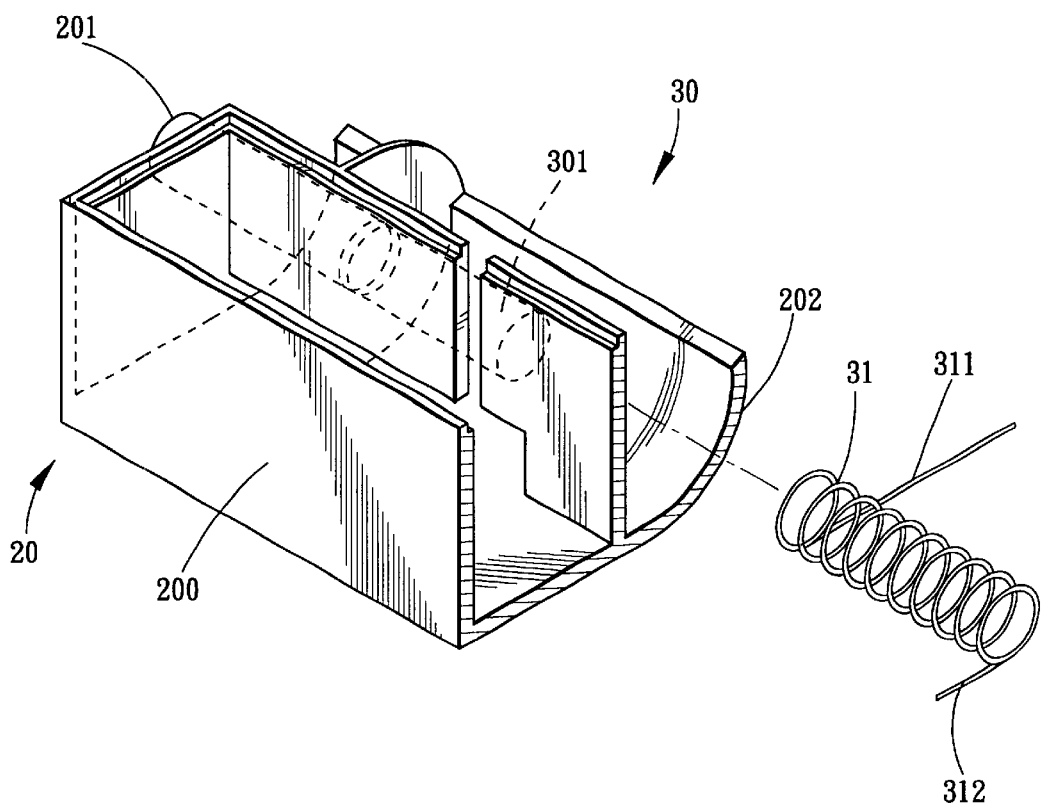
FIG. 2 is a fragmentary exploded perspective view of a control panel of the first preferred embodiment of the present invention.

Referring to FIGS. 1, 2, and 3, the optical disk drive assembly further comprises a positioning device 30 for positioning the control panel 20 in the first position. The positioning device 30 includes an extension 301 extending inwardly from one of the pivot axles 201, and a torsion spring 31 mounted on the extension 301. The torsion spring 31 has a first end 311 connected to the hollow housing 10 adjacent to the front end 103 of the bottom wall 100, and a second end 312 connected to the control panel 20 in order to bias the control panel 20 to the first position. In this state, the control keys 203 on the control panel 20 can be concealed within the hollow housing 10 to avoid unintentional depressing of the control keys 203 when the optical disk drive 40 is actuated. Because the control keys 203 for manipulation of the optical disk drive 40 are disposed on the control panel 20, there is no need to allocate space for the same on the keyboard of the notebook PC. The objects of the present invention are thus met.

Figure 4:
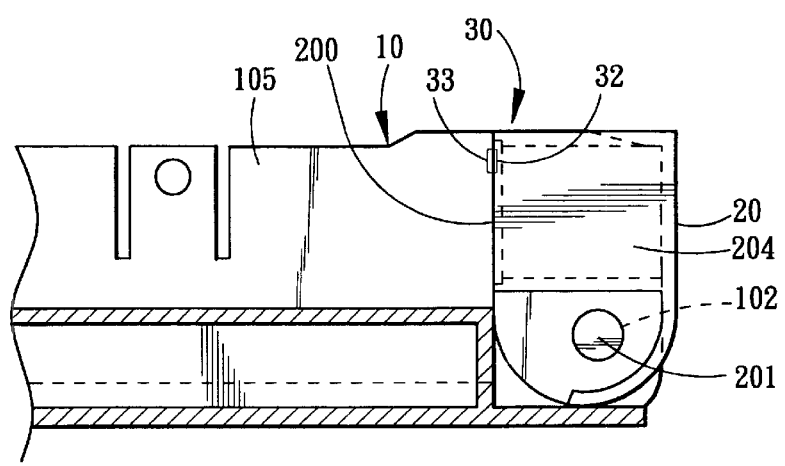
FIG. 4 is a fragmentary sectional view of a second preferred embodiment of an optical disk drive assembly according to the present invention, in which an optical disk drive of the optical disk drive assembly is removed for the sake of clarity.

FIG. 4 shows a second preferred embodiment of an optical disk drive assembly according to the present invention. In this embodiment, the structures of the hollow housing 10, the control panel 20, and the optical disk drive (not shown) are similar to those of the hollow housing 10, the control panel 20, and the optical disk drive 40 of the first preferred embodiment except that the positioning device 30 includes a first magnetically attractive member 32 and a second magnetically attractive member 33. The first magnetically attractive member 32 is fixed on the control panel 20 on the side face 200 adjacent to one of the opposite ends 204. The second magnetically attractive member 33 is mounted on the front portion of a corresponding one of the side walls 105. The first and second magnetically attractive members 32, 33 are connected to one another when the control panel 20 turns to the first position. The first magnetically attractive member 32 is a permanent magnet piece, and the second magnetically attractive member 33 is an iron piece. However, it is understood that the first and second magnetically attractive members 32, 33 may both be permanent magnet pieces.

Figure 5:
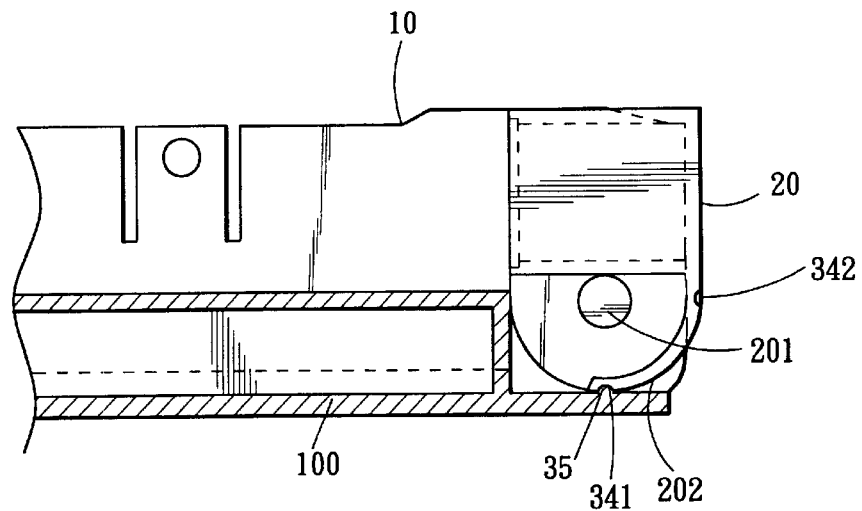
FIG. 5 is a fragmentary sectional view of a third preferred embodiment of an optical disk drive assembly according to the present invention, in which an optical disk drive of the optical disk drive assembly is removed for the sake of clarity.
Figure 6:
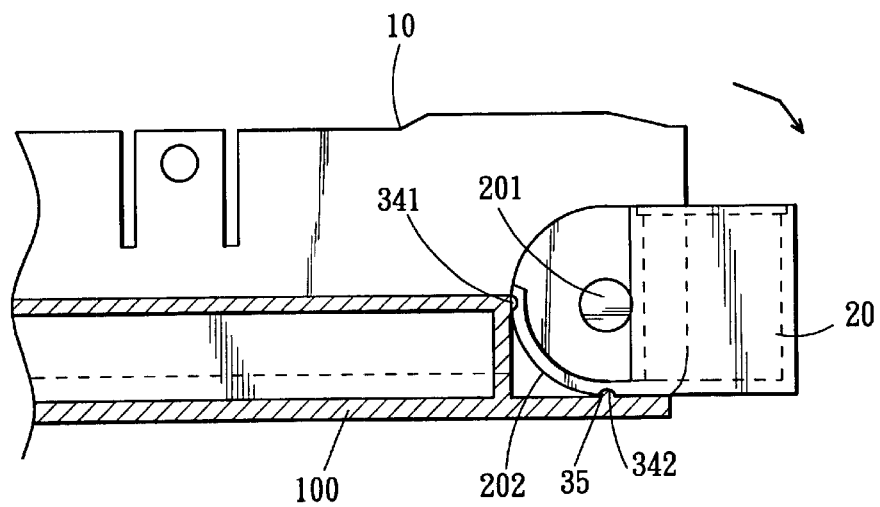
FIG. 6 is a view similar to that of FIG. 5, in which a control panel of the third preferred embodiment is in a second position.

Referring to FIGS. 5 and 6, a third preferred embodiment of an optical disk drive assembly according to the present invention is shown to comprise a hollow housing 10 and a control panel 20 that are similar to those of the first preferred embodiment. In this embodiment, however, the positioning device 30 includes a rounded projection 35 formed on a top face of the bottom wall 100 adjacent to the front end 103 of the bottom wall 100 and adjacent to one of the side walls 105, and a first recess 341 formed in the arcuate side face 202 adjacent to one of the opposite ends 204 of the control panel 20. The rounded projection 35 engages the first recess 341 in order to retain releaseably the control panel 20 in the first position when the control panel 20 turns to the first position, as best illustrated in FIG. 5. In addition, a second recess 342 is formed in the arcuate side face 202 at one of the opposite ends 204 and is spaced angularly from the first recess 341. The second recess 342 engages the rounded projection 35 in order to retain releaseably the control panel 20 in the second position when the control panel 20 turns to the second position, as best illustrated in FIG. 6.

Figure 7:
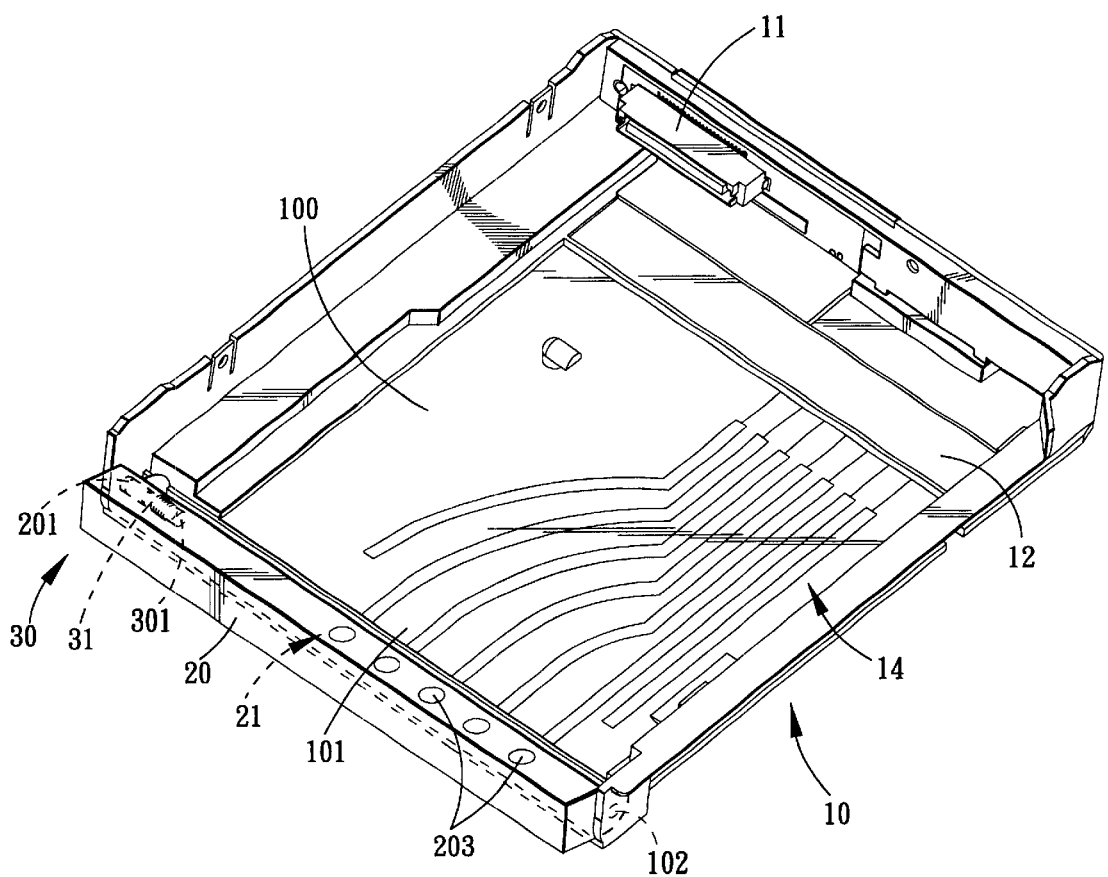
FIG. 7 is a perspective view of a fourth preferred embodiment of an optical disk drive assembly according to the present invention, in which a circuit board is connected electrically to a control panel via conductive traces on a hollow housing and contacts on the control panel.

To transmit the control signals from the control keys 203 to the optical disk drive 40, the control keys 203 on the control panel 20 are connected electrically to the circuit board 12 by virtue of a ribbon cable 13, as best illustrated in FIG. 1. Alternatively, with reference to FIG. 7, seven arcuate conductive traces 14 are disposed on the top face of the bottom wall 100 of the hollow housing 10. The control panel 20 has conductors 21 that contact electrically and slidably the conductive traces 14. The conductors 21 are connected electrically and respectively to the control keys 203.

While the present invention has been described in connection with what is considered the most practical and preferred embodiments, it is understood that this invention is not limited to the disclosed embodiments but is intended to cover various arrangements included within the spirit and scope of the broadest interpretations and equivalent arrangements.

I claim:

1. An optical disk drive assembly, comprising:
   a hollow housing having a bottom wall, and a front opening formed at a front end of said bottom wall;
   an optical disk drive mounted inside said hollow housing and disposed rearwardly of said front end of said bottom wall;
   a control panel movably disposed forwardly of said optical disk drive at said front end of said bottom wall, said control panel having a side face, and a plurality of control keys disposed on said side face, said control keys being connected electrically to said optical disk drive for manipulation of said optical disk drive, said control panel being mounted pivotally inside said hollow housing about a pivot axis that extends in a lateral direction substantially transverse to a front-to-rear direction of said hollow housing to turn between a first position where said side face of said control panel faces rearwardly of said hollow housing to conceal said control keys inside said hollow housing, and a second position where said side face of said control panel faces upwardly of said hollow housing to expose said control keys at said front opening, wherein said hollow housing further has two opposite side walls extending upward from two opposite sides of said bottom wall and extending rearwardly from said front end of said bottom wall, each of said opposite side walls having a front portion adjacent to said front end of said bottom wall, and a pivot hole formed in said front portion thereof, said control panel being elongated in a direction parallel to said lateral direction, said control panel having two pivot axles extending longitudinally and outwardly from two opposite ends thereof and extending coaxially with said pivot axis, said pivot axles being inserted into said pivot holes in said side walls in order to connect pivotally said control panel to said hollow housing between said opposite side walls; and a positioning device for positioning said control panel in said first position, wherein said positioning device includes a torsion spring mounted on said control panel adjacent to one of said pivot axles, said torsion spring having a first end connected to said hollow housing adjacent to said front end of said bottom wall, and a second end connected to said control panel in order to bias said control panel to said first position.

2. An optical disk drive assembly, comprising:

a hollow housing having a bottom wall, and a front opening formed at a front end of said bottom wall;

an optical disk drive mounted inside said hollow housing and disposed rearwardly of said front end of said bottom wall;

a control panel movably disposed forwardly of said optical disk drive at said front end of said bottom wall, said control panel having a side face, and a plurality of control keys disposed on said side face, said control keys being connected electrically to said optical disk drive for manipulation of said optical disk drive, said control panel being mounted pivotally inside said hollow housing about a pivot axis that extends in a lateral direction substantially transverse to a front-to-rear direction of said hollow housing to turn between a first position where said side face of said control panel faces rearwardly of said hollow housing to conceal said control keys inside said hollow housing, and a second position where said side face of said control panel faces upwardly of said hollow housing to expose said control keys at said front opening, wherein said hollow housing further has two opposite side walls extending upward from two opposite sides of said bottom wall and extending rearwardly from said front end of said bottom wall, each of said opposite side walls having a front portion adjacent to said front end of said bottom wall, and a pivot hole formed in said front portion thereof, said control panel being elongated in a direction parallel to said lateral direction, said control panel having two pivot axles extending longitudinally and outwardly from two opposite ends thereof and extending coaxially with said pivot axis, said pivot axles being inserted into said pivot holes in said side walls in order to connect pivotally said control panel to said hollow housing between said opposite side walls; and a positioning device for positioning said control panel in said first position, wherein said positioning device includes a first magnetically attractive member fixed on said control panel on said side face of said control panel, and a second magnetically attractive member mounted on said front portion of a corresponding one of said side walls, said first and second magnetically attractive members being connected to one another when said control panel turns to said first position.

3. The optical disk drive assembly as claimed in claim 2, wherein said first and second magnetically attractive members are permanent magnet pieces.

4. The optical disk drive assembly as claimed in claim 2, wherein said first magnetically attractive member is a permanent magnet piece, said second magnetically attractive member being an iron piece.

5. An optical disk drive assembly, comprising:

a hollow housing having a bottom wall, and a front opening formed at a front end of said bottom wall;

an optical disk drive mounted inside said hollow housing and disposed rearwardly of said front end of said bottom wall;

a control panel movably disposed forwardly of said optical disk drive at said front end of said bottom wall, said control panel having a side face, and a plurality of control keys disposed on said side face, said control keys being connected electrically to said optical disk drive for manipulation of said optical disk drive, said control panel being mounted pivotally inside said hollow housing about a pivot axis that extends in a lateral direction substantially transverse to a front-to-rear direction of said hollow housing to turn between a first position where said side face of said control panel faces rearwardly of said hollow housing to conceal said control keys inside said hollow housing, and a second position where said side face of said control panel faces upwardly of said hollow housing to expose said control keys at said front opening, wherein said hollow housing further has two opposite side walls extending upward from two opposite sides of said bottom wall and extending rearwardly from said front end of said bottom wall, each of said opposite side walls having a front portion adjacent to said front end of said bottom wall, and a pivot hole formed in said front portion thereof, said control panel being elongated in a direction parallel to said lateral direction, said control panel having two pivot axles extending longitudinally and outwardly from two opposite ends thereof and extending coaxially with said pivot axis, said pivot axles being inserted into said pivot holes in said side walls in order to connect pivotally said control panel to said hollow housing between said opposite side walls; and a positioning device for positioning said control panel in said first position, wherein said positioning device includes a rounded projection formed on a top face of said bottom wall adjacent to said front end of said bottom wall and adjacent to one of said side walls, and a first recess formed adjacent to one of said opposite ends of said control panel, said rounded projection engaging said first recess when said control panel turns to said first position.

6. The optical disk drive assembly as claimed in claim 5, wherein said control panel further has a second recess formed on said one of said opposite ends thereof and spaced angularly from said first recess, said second recess engaging said rounded projection when said control panel turns to said second position in order to position said control panel in said second position.

7. An optical disk drive assembly, comprising:

a hollow housing having a bottom wall, and a front opening formed at a front end of said bottom wall;

an optical disk drive mounted inside said hollow housing and disposed rearwardly of said front end of said bottom wall;

a control panel movably disposed forwardly of said optical disk drive at said front end of said bottom wall, said control panel having a side face, and a plurality of control keys disposed on said side face, said control keys being connected electrically to said optical disk drive for manipulation of said optical disk drive, said control panel being mounted pivotally inside said hollow housing about a pivot axis that extends in a lateral direction substantially transverse to a front-to-rear direction of said hollow housing to turn between a first position where said side face of said control panel faces rearwardly of said hollow housing to conceal said control keys inside said hollow housing, and a second position where said side face of said control panel faces upwardly of said hollow housing to expose said control keys at said front opening and;

a ribbon cable that interconnects electrically said control keys on said control panel and said optical disk drive.

8. An optical disk drive assembly, comprising:

a hollow housing having a bottom wall, and a front opening formed at a front end of said bottom wall;

an optical disk drive mounted inside said hollow housing and disposed rearwardly of said front end of said bottom wall;

a control panel movably disposed forwardly of said optical disk drive at said front end of said bottom wall, said control panel having a side face, and a plurality of control keys disposed on said side face, said control keys being connected electrically to said optical disk drive for manipulation of said optical disk drive, said control panel being mounted pivotally inside said hollow housing about a pivot axis that extends in a lateral direction substantially transverse to a front-to-rear direction of said hollow housing to turn between a first position where said side face of said control panel faces rearwardly of said hollow housing to conceal said control keys inside said hollow housing, and a second position where said side face of said control panel faces upwardly of said hollow housing to expose said control keys at said front opening, wherein said bottom wall of said hollow housing has a plurality of conductive traces disposed thereon, said control panel having a plurality of conductors that contact electrically and slidably said conductive traces, said conductors being connected electrically and respectively to said control keys.

* * * * *